United States Patent
Ramegowda et al.

(10) Patent No.: US 11,826,295 B2
(45) Date of Patent: Nov. 28, 2023

(54) PORT FOR AN INTERNAL AIR DISTRIBUTION SYSTEM OF A PATIENT SUPPORT SURFACE

(71) Applicant: Hill-Rom Services, Inc., Batesville, IN (US)

(72) Inventors: Jnanesha Ramegowda, Batesville, IN (US); Douglas E. Borgman, Batesville, IN (US); Michael Churilla, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 17/534,534

(22) Filed: Nov. 24, 2021

(65) Prior Publication Data
US 2022/0160559 A1 May 26, 2022

Related U.S. Application Data

(60) Provisional application No. 63/118,248, filed on Nov. 25, 2020.

(51) Int. Cl.
*A61G 7/057* (2006.01)

(52) U.S. Cl.
CPC ................ *A61G 7/05784* (2016.11)

(58) Field of Classification Search
None
See application file for complete search history.

(56) References Cited

U.S. PATENT DOCUMENTS

| 2013/0160649 A1* | 6/2013 | Spryshak | ............... B01D 45/08 55/423 |
| 2017/0360601 A1* | 12/2017 | McGregor | ............ A61F 7/0097 |
| 2019/0262201 A1* | 8/2019 | Borgman | ........... A61G 7/05784 |

* cited by examiner

*Primary Examiner* — Justin C Mikowski
*Assistant Examiner* — Adam C Ortiz
(74) *Attorney, Agent, or Firm* — Barnes & Thornburg LLP

(57) ABSTRACT

A patient support surface includes a blower assembly positioned within the support surface. Ports positioned on the sides of the support surface are configured to be assembled to a cover of the support surface to form a hermetic seal at the periphery of the port. The ports are configured to cause liquids to be conducted away from a flow path into the blower assembly.

22 Claims, 4 Drawing Sheets

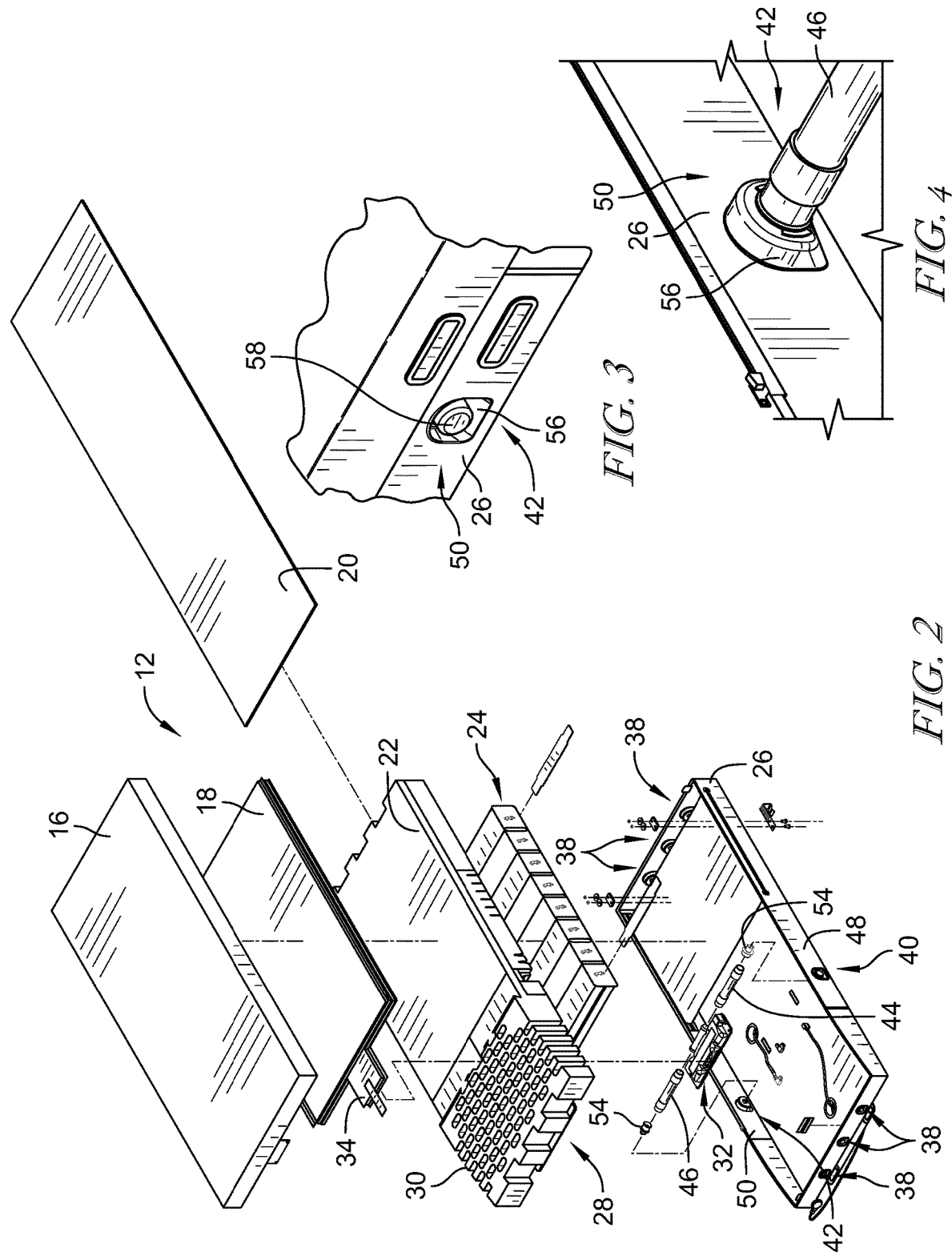

PORT FOR AN INTERNAL AIR DISTRIBUTION SYSTEM OF A PATIENT SUPPORT SURFACE

CROSS-REFERENCE TO RELATED APPLICATIONS

The present application claims the benefit, under 35 U.S.C. § 119(e), to U.S. Provisional Patent Application No. 63/118,248 which was filed Nov. 25, 2020 and which is hereby incorporated by reference herein in its entirety.

BACKGROUND

The present disclosure relates to a port for an air distribution system. More specifically, the present disclosure relates to a port that can be mechanically integrated into an internal air distribution system, such as an air distribution system found in a patient mattress to redirect moisture from a surface a patient lies on.

A support surface, such as a mattress, used for patients for hospital beds, medical beds, or other types of beds may be used by a patient to spend an extended period of time on the support surface. Patients who are positioned on a mattress for an extended period of time are at risk of developing skin conditions, such as bed sores, due to heat and moisture along the interface of the patient with the surface of the mattress. Some mattresses used by patients have an air distribution system that may conduct air along the interface of a patient with the surface to keep the patient's skin cool and dry. In many cases, such a mattress is integrated into the hospital bed so that the bed and mattress are interconnected electrically and the mattress is configured to fit on a particular version of a hospital bed.

The integrations of mattresses to hospital beds has the benefit of allowing the bed and mattress to cooperate and share controls and power. However, the benefits of the mattress may not be experienced on beds where the integration of the mattress has not been made. Additionally, the use of integrated systems may require additional expenses in a hospital bed that provides advanced functionality that is not necessary or cost effective in all cases. The challenge presented is the need for an external power system and air source for the mattress contained in a separate control box. This can be cumbersome as the control box must be positioned on or near the hospital bed and may create entanglement concerns, as well as generally taking up space. However, a mattress that has the necessary controls and air source within the mattress avoids these concerns.

A challenge is presented in cases where the controls and air source are located within the mattress in that getting sufficient air flow, while also preventing unwanted materials from ingressing into the mattress can be a challenge. This requires a port for an air distribution system in a mattress. Some ports cannot be easily connected to or removed from the air distribution system. Accordingly, some ports cannot be cleaned or easily replaced. Additionally, some ports are not effective in preventing foreign materials, like fluids, from entering the air distribution system. This defeats the purpose of the air distribution system, and puts the patient at greater risk for skin conditions that develop as a result of heat and moisture along the interface of the patient with the surface of the mattress.

SUMMARY

The present disclosure includes one or more of the features recited in the appended claims and/or the following features which, alone or in any combination, may comprise patentable subject matter.

According to a first aspect of the present disclosure, a patient support surface is configured to conduct air along a top face of the support surface so that heat and moisture from a patient lying on the support surface are conducted away from the top face of the support surface. The support surface comprises a lower cover, an air distribution layer, a port, and a blower assembly. The lower cover of the support surface is formed to include an opening formed in a side of the lower cover of the support surface. The air distribution layer is positioned within the support surface. The port defines a tortuous path for a flow of air through the port. The port is positioned within the opening and hermetically sealed to the lower cover. The port includes a housing defining a lower surface having a descending angle configured to allow gravity to conduct liquids over the lower surface away from the tortuous path. The blower assembly is operable to draw air through the port and push air through the air distribution layer.

In some embodiments, the port may include a cap secured within a passageway formed in the housing, the cap including a flange that is resiliently flexible such that the flange is deflectable to be positioned through the passageway and secure to the housing with an interference fit.

In some embodiments, the cap may include a second flange that is also resiliently flexible such that the second flange is deflectable to be positioned through the passageway and secure to the housing with an interference fit.

In some embodiments, one or more flanges of the cap may be welded to a portion of the housing to secure the cap to the housing.

In some embodiments, the port may further comprise a connector secured within the passageway formed in the housing, the connector including a flange that is resiliently flexible such that the flange is deflectable to be positioned through the passageway and secure to the housing with an interference fit.

In some embodiments, the connector may include a second flange that is also resiliently flexible such that the second flange is deflectable to be positioned through the passageway and secure to the housing with an interference fit.

In some embodiments, the support surface may further include a conduit extending between the connector and the blower assembly, the conduit positioned on the connector such that air that flows through the tortuous path is conducted through the conduit and into the blower assembly.

According to a second aspect of the present disclosure, a port for a support surface comprises a housing, a cap, and a connector. The housing defines a cavity and a passageway having an outer surface. The housing further includes drain surface defining a descending angle positioned in the cavity and configured to allow gravity to conduct foreign materials over the outer surface of the passageway and over drain surface away from the passageway. The cap includes a resiliently pliable flange that is received within the passageway and expands within the housing such that the flange is secured to the housing by an interference fit. The cap and housing cooperating to define a tortuous path for a flow of air through the port. The connector has first portion for securing the connector to a conduit and a second portion, the second portion including a resiliently pliable flange that is received within the passageway and expands within the housing such that the flange is secured to the housing by an interference fit.

In some embodiments, the housing may include a flange configured to engage a material about the periphery of the housing to be hermetically sealed to the material.

In some embodiments, the housing may include a cylindrical body, the cylindrical body defining the passageway, the cylindrical body having a circumferential outer surface.

In some embodiments, the cylindrical body may include a circular surface, the passageway extending between the circular surface and a back wall of the housing, the flange of the connector engaging the circular surface to secure the connector to the housing.

In some embodiments, the flange of the cap may engage the back wall of the housing to secure the cap to the housing.

In some embodiments, the flange of the cap may be further secured to the housing by a weld.

In some embodiments, the tortuous path may include a first stage that extends between the outer ambient atmosphere and an inner wall of the housing.

In some embodiments, the tortuous path may include a second stage that extends between the inner wall of the housing and the interior of the cap, the second stage directing flow in a direction opposite the direction of flow in the first stage to thereby encourage foreign materials to be deposited at the transition between the first and second stage.

In some embodiments, the cap may have a defined width greater than the outer width of the passageway such that the cap overlaps the passageway of the housing to prevent the direct ingress of foreign materials into the passageway.

According to a third aspect of the present disclosure, a method for installing a port to a patient support surface to define a tortuous path into the inner space of the patient support surface comprises securing a housing to a cover of the patient support surface to form a hermetic seal between the housing and the cover, deflecting a resiliently pliable portion of a cap to insert the deflected portion of the cap through a passageway formed in the housing from a first side of the housing, and permitting the resiliently pliable portion of the cap to expand to secure the cap to the housing through an interference fit, the cap overlying a portion of the passageway to form the tortuous path.

In some embodiments, the method may further comprise deflecting a resiliently pliable portion of a connector to insert the deflected portion of the connector through the passageway from a second side of the housing, and permitting the resiliently pliable portion of the connector to expand to secure the connector to the housing through an interference fit.

In some embodiments, the cover may be secured to the housing by radio frequency welding.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which:

FIG. 2 is an exploded view of the support surface of FIG. 1 having an air disbursing layer, two ports, and a blower assembly positioned therein;

FIG. 3 is a perspective view of a portion of the support surface of FIG. 1 enlarged to show the a port positioned in a side of the support surface;

FIG. 4 is a perspective view of an internal portion of the support surface showing a port conduit secured to a port;

DETAILED DESCRIPTION

The referenced figures depict an embodiment of a port for a support surface designed to conduct heat and moisture away from a patient lying on a top face of the support surface by conducting air along the top face of the support surface. The design of the port reduces the potential of ingress of foreign materials from entering an air blower system attached to the port.

The port of the depicted embodiment comprises of three components which when assembled, allows for air flow into the air blower system and directs foreign materials, such as fluids, away from the air blower system. The three components are easily assembled with interference fits. In the disclosed embodiment, the components of the port are constructed of a polymeric material. In some embodiments, the components of the port may be secured to one another by an interference fit. In other embodiments, the components may be secured through adhesives or welding, such as radio frequency (RF) welding, for example.

Figure 1:
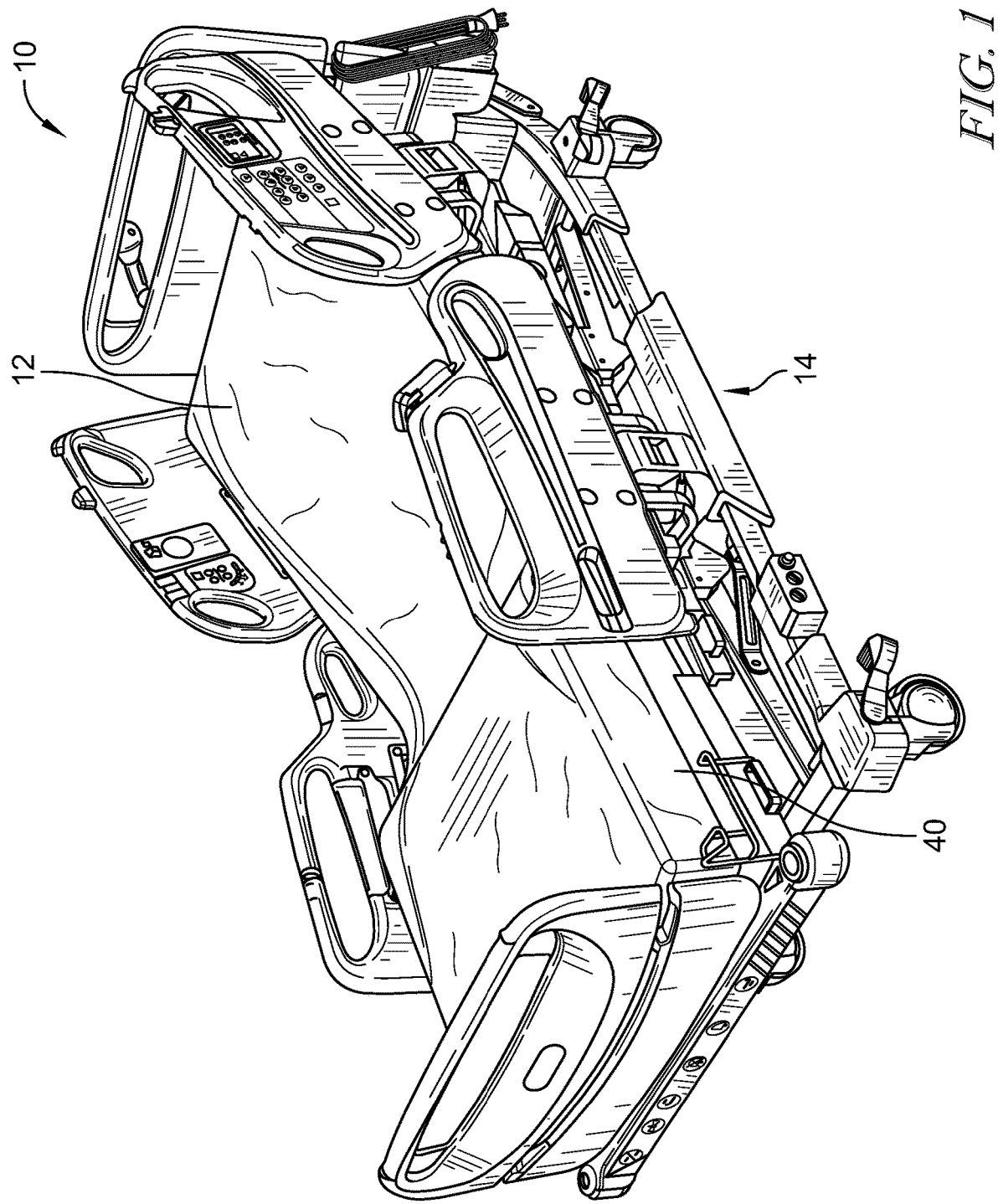
FIG. 1 is a perspective view of a patient support apparatus embodied as a hospital bed supporting a support surface embodied as a mattress, the mattress having an internal air supply and control system positioned within the mattress.

An illustrative a patient support apparatus 10 includes a support surface embodied as a mattress 12 supported on a hospital bed 14 is shown in FIG. 1. The support surface 12 is illustrated as a hospital mattress; however, it will be appreciated that the support surface 12 may be utilized for any healthcare facility or home. For example, the support surface 12 may be utilized in a nursing home or in a patient's own home under hospice care. Additionally, although this description is in reference to a mattress, it will be appreciated that the support surface 12 and devices described herein may be applicable to other support surfaces, such as chair cushions, wheelchair padding, stretchers, etc. The support surface 12 may be embodied as mattress such as that disclosed as element 320 in U.S. Patent Publication No. 2019/0262201A1 which is incorporated by reference herein for the disclosure of an air moving system capable of employing the structures recited herein as a port.

Referring to FIG. 2, the support surface 12 has several layers and includes a top cover 16, an air distribution layer 18, a fire sock 20, a foam cover 22, a bladder assembly 24, and a lower cover 26. In addition, a foam support structure 28 includes a foot support section 30. A blower assembly 32 is connected to the air distribution layer 18 thought a fabric conduit 34 and air is forced through the air distribution layer 18 to move air along the top cover 16 to thereby remove moisture from the inside of the top cover 16 and cool the skin of a patient supported on the top cover 16. The air flows out of the air distribution layer and out of the mattress 12 through a number of ports 38 positioned in the lower cover 26 at the foot end and head end of the support surface 12.

Air flows into the blower assembly 32 through two ports 40, 42 which are connected to two port conduits 44, 46. The ports 40, 42 are positioned in respective sides 48, 50 of the lower cover 26. FIG. 3 shows the port 42 from the exterior while FIG. 4 shows the port 42 from inside the lower cover 26 coupled to the port conduit 46. In some embodiments, the flow may be reversed and air may be drawn through the ports 38 and the air distribution layer 18 and out of the ports 40, 42.

Figure 8:
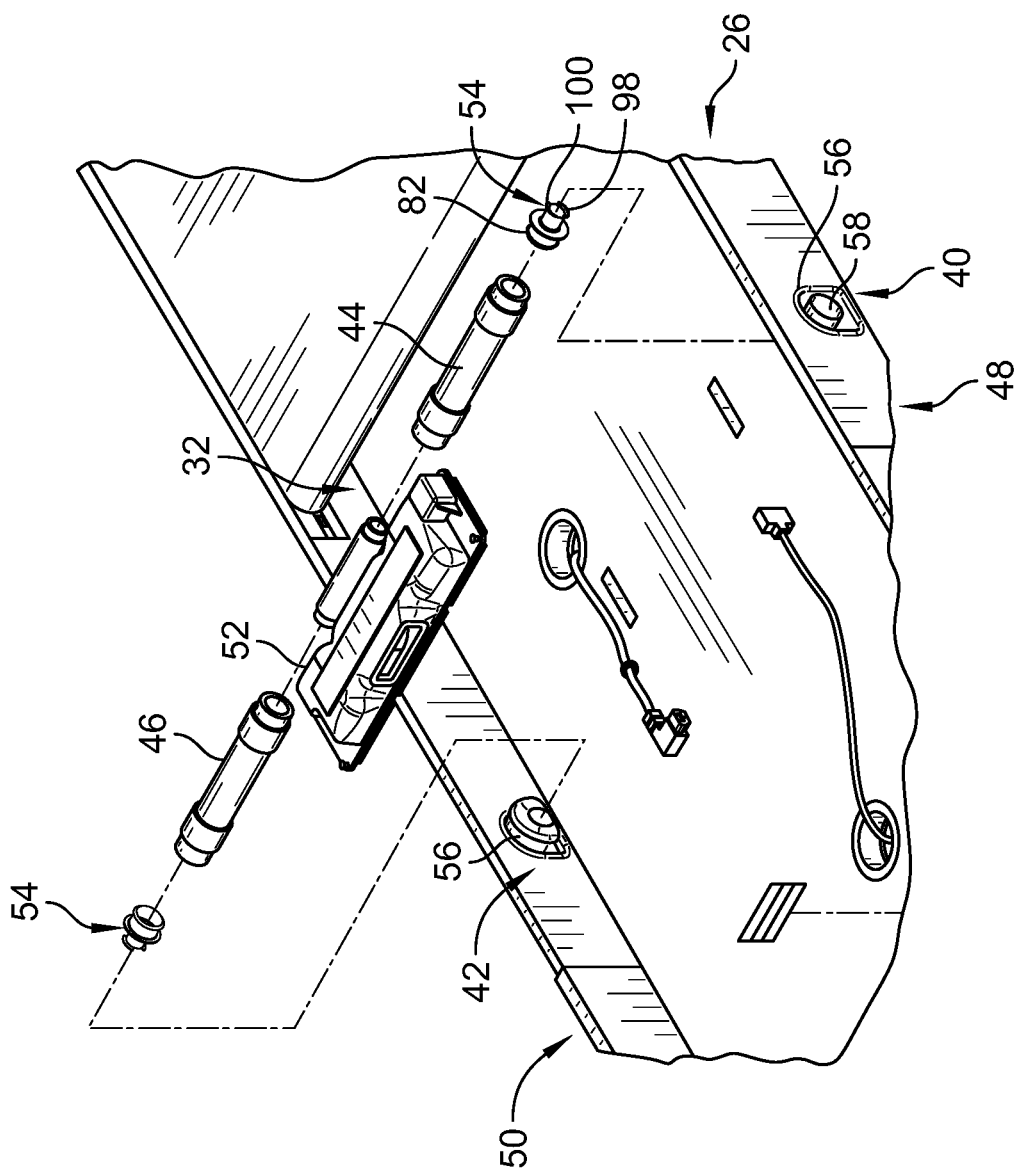
FIG. 8 is an enlarged portion of FIG. 2 showing the assembly of the blower assembly to the port conduits and ports.

The engagement of the ports 40, 42 with the conduits 44, 46 and the blower assembly 32 is shown enlarged in FIG. 8. The blower assembly 32 is illustrated in FIG. 8 with the conduits 44, 46 shown as extending between respective sides of a housing 52 of the blower assembly 32. The conduits 44, 46 are in fluid communication with the ports 40, 42, with a connector 54 on the outboard end of each conduit 44, 46 that connects the conduits 44, 46 to the respective ports 40, 42 as described below.

Figure 7:
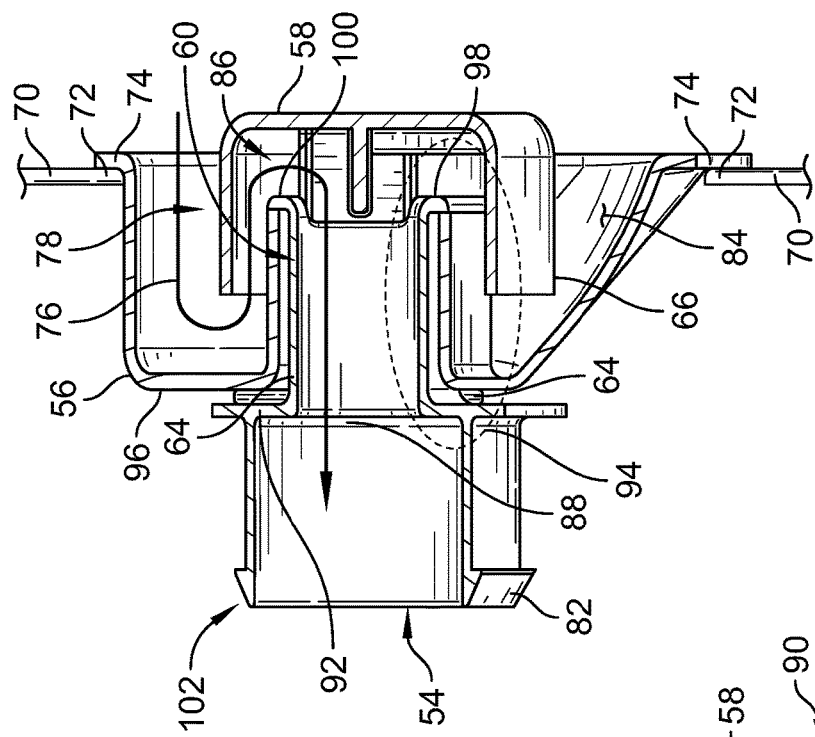
FIG. 7 is a cross-section of the assembled port showing a tortuous path for air to flow through the port into the port conduit.
Figure 6:
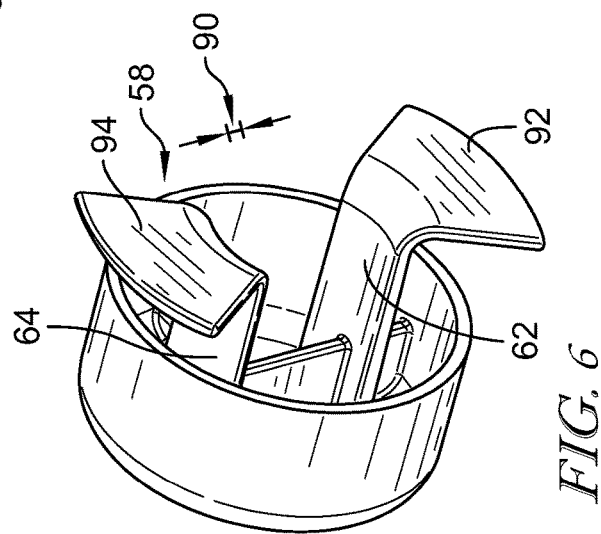
FIG. 6 is perspective view of a cap of the port of FIG. 2.
Figure 5:
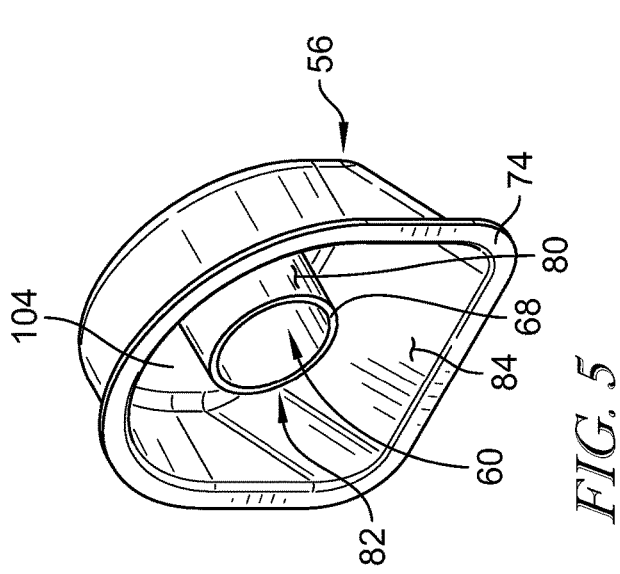
FIG. 5 is a perspective view of a portion of the port of FIG. 2.

Referring to FIGS. 5-7, each port 40, 42 includes a housing 56 and cap 58. As shown in FIG. 7, the cap 58 is positioned in a passageway 60 of the housing 56 and is secured to the housing 56 with an interference fit. As shown in FIG. 7, the connector 54 is received between two flanges 62, 64 of the cap 58 and is secured with a flange 66 of the connector 54 being flexibly deformed to pass through the passageway 60 inside of the two flanges 62, 64 and then expanding such that the flange 66 engages a circular surface 68 (seen in FIG. 5).

Figure 9:
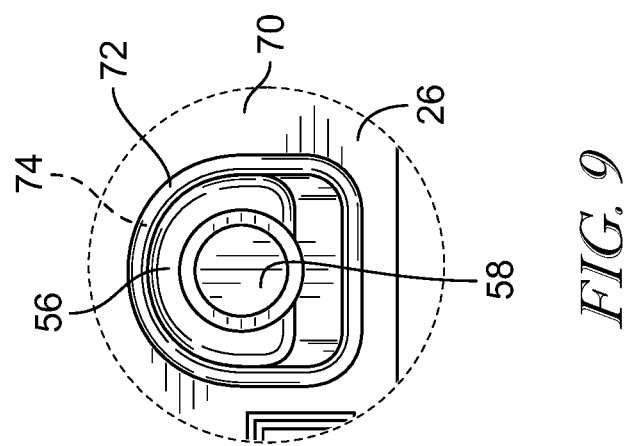
FIG. 9 is an enlarged view of the port of FIG. 8 showing the flange of the port body welded to a lower cover of the support surface.

Referring to FIG. 9, it can be seen that a flange 74 of the housing 56 is welded to a ticking material 70 of the lower cover 26 to provide a hermetic seal 72 between the ticking material 70 and the periphery of the housing 56 at the flange 74. This prevents air from bypassing the respective port 40, 42. In use, the blower assembly 32 draws air through the respective port 40, 42 into the housing 52 of the blower assembly 32 and then pushed through the air distribution layer 18.

The ports 40, 42, when assembled, are configured to permit air to be drawn into the mattress 12 by the blower assembly 32 while redirecting foreign materials and reducing the potential for foreign materials to be drawn into the blower assembly 32 and pushed into the distribution layer 18. For example, human excrement and other biomaterials, cleaning materials, dust, and spilled fluids all have the potential to drain down the side of the lower cover 26 and be drawn into the ports 40, 42. As illustrated in FIG. 7, the ports 40, 42 form a tortuous path 76 for air to flow from the ambient area around the respective port 40, 42 and through a first stage 78 where foreign materials end to be deposited on either a circumferential surface 80 of a cylindrical body 82 that defines the passageway 60. The cylindrical body 82 extends from an inner wall 104 of the housing 56. Foreign materials that are vertically above the cylindrical body 82 will fall on the circumferential surface 80 and fall, through the force of gravity around the circumferential surface 80 and onto a lower surface 84 which tends to cause the foreign material to drain down the surface 84 and out of the port 40, 42.

Once the air and any contaminate passes from the first stage 78 it enters a second stage 86 which will again cause material to engage the interior of the cap 58 and be conducted down to the lower side of the circumferential surface 80. The level of flow into the respective port 40, 42 is controlled so that heavy materials are not sucked into the port 40, 42, but fall down the surfaces 80, 84 of the housing 56 of the ports 40, 42. The air then flows into a final stage 88 which flows directly into the blower assembly 32.

To assemble the ports 40, 42, the flanges 62, 64 of the cap 58, which are resiliently flexible, are deflected together as indicated by arrows 90 in FIG. 6. The flanges 62, 64 are then passed through the passageway 60 so that the respective catches 92, 94 of the flanges 62, 64 are positioned behind a back wall 96 of the housing 56 and thereby secure the cap 58 to the housing 56. The catches 92, 94 are radio frequency welded to the back wall 96. In some embodiments, the catches 92, 94 may be secured to the back wall 96 by an interference fit only. The connector 54 also includes two catches 98, 100 that are deflected and moved through the passageway 60, between the flanges 62, 64 of the cap 58 and then engage the circular surface 68 of the housing 56. Once in place, the connector 54 includes a barb 102 over which the respective conduit 44, 46 is positioned to form an interference fit to secure the respective conduit 44, 46 to the connector 54 to form the flow path into the blower assembly 32. During operation, air flows around the cap 58 and through the passageway 60 and connector 54 to supply the blower assembly 32. Due to the tortuous path 76 and the overall construction of the ports 40, 42, the ingress of foreign materials into the blower assembly 32 and other components of the support surface 12 is limited, thereby extending the life of the entire system.

Although this disclosure refers to specific embodiments, it will be understood by those skilled in the art that various changes in form and detail may be made without departing from the subject matter set forth in the accompanying claims.

The invention claimed is:

1. A support surface configured to conduct air along a top face of the support surface so that heat and moisture from a patient lying on the support surface are conducted away from the top face of the support surface, the support surface comprising
a lower cover of the support surface, including an opening formed in a side of the lower cover of the support surface,
an air distribution layer within the support surface,
a port defining a tortuous path for a flow of air through the port, the port positioned within the opening and hermetically sealed to the lower cover, the port including a housing defining a lower surface having a descending angle configured to allow gravity to conduct liquids over the lower surface away from the tortuous path, and
a blower assembly operable to draw air through the port and push air through the air distribution layer,
wherein the port includes a cap secured within a passageway formed in the housing, the cap including a flange that is resiliently flexible such that the flange is deflectable to be positioned through the passageway and secure to the housing with an interference fit, and
wherein the cap includes a second flange that is also resiliently flexible such that the second flange is deflectable to be positioned through the passageway and secure to the housing with an interference fit.

2. The support surface of claim 1, wherein the support surface further comprises a connector, the connector having a first portion for securing the connector to a conduit connected to the blower and a second portion, the second portion including a resiliently pliable flange received within the passageway and expanding within the housing such that the flange is secured to the housing by an interference fit.

3. The support surface of claim 2, wherein the housing includes a cylindrical body, the cylindrical body defining the passageway and a front surface, the passageway extending between the front surface and a back wall of the housing, the flange of the connector engaging the front surface to secure the connector to the housing.

4. The support surface of claim 3, wherein at least one of the first and second flange of the cap engages the back wall of the housing to secure the cap to the housing.

5. The support surface of claim 1, wherein the housing includes a flange configured to engage a material about the periphery of the housing to be hermetically sealed to the material.

6. The support surface of claim 1, the tortuous path includes a first stage that extends between an exterior of the lower cover and an inner wall of the housing.

7. The support surface of claim 6, wherein the tortuous path includes a second stage that extends between the inner wall of the housing and the interior of the cap, the second stage directing flow in a direction opposite the direction of flow in the first stage to thereby encourage foreign materials to be deposited at the transition between the first and second stage.

8. A support surface configured to conduct air along a top face of the support surface so that heat and moisture from a patient lying on the support surface are conducted away from the top face of the support surface, the support surface comprising
a lower cover of the support surface, including an opening formed in a side of the lower cover of the support surface,
an air distribution layer within the support surface,
a port defining a tortuous path for a flow of air through the port, the port positioned within the opening and hermetically sealed to the lower cover, the port including a housing defining a lower surface having a descending angle configured to allow gravity to conduct liquids over the lower surface away from the tortuous path, and
a blower assembly operable to draw air through the port and push air through the air distribution layer,
wherein the port includes a cap secured within a passageway formed in the housing, the cap including a first flange that is resiliently flexible such that the first flange is deflectable to be positioned through the passageway and secure to the housing with an interference fit, and
wherein the port further comprises a connector secured within the passageway formed in the housing, the connector including a flange that is resiliently flexible such that the flange is deflectable to be positioned through the passageway and secure to the housing with an interference fit.

9. The support surface of claim 8, wherein the connector includes a second flange that is also resiliently flexible such that the second flange is deflectable to be positioned through the passageway and secure to the housing with an interference fit.

10. The support surface of claim 8, wherein the connector has a first portion for securing the connector to a conduit connected to the blower and a second portion, the second portion including the resiliently pliable flange positioned through the passageway.

11. The support surface of claim 10, wherein the housing includes a cylindrical body, the cylindrical body defining the passageway and a front surface, the passageway extending between the front surface and a back wall of the housing, the flange of the connector engaging the front surface to secure the connector to the housing.

12. The support surface of claim 8, wherein the flange of the cap engages a back wall of the housing to secure the cap to the housing.

13. The support surface of claim 8, wherein the housing includes a flange configured to engage a material about the periphery of the housing to be hermetically sealed to the material.

14. The support surface of claim 8, the tortuous path includes a first stage that extends between an exterior of the lower cover and an inner wall of the housing.

15. The support surface of claim 14, wherein the tortuous path includes a second stage that extends between the inner wall of the housing and the interior of the cap, the second stage directing flow in a direction opposite the direction of flow in the first.

16. A support surface configured to conduct air along a top face of the support surface so that heat and moisture from a patient lying on the support surface are conducted away from the top face of the support surface, the support surface comprising
a lower cover of the support surface, including an opening formed in a side of the lower cover of the support surface,
an air distribution layer within the support surface,
a port defining a tortuous path for a flow of air through the port, the port positioned within the opening and hermetically sealed to the lower cover, the port including a housing defining a lower surface having a descending angle configured to allow gravity to conduct liquids over the lower surface away from the tortuous path, and
a blower assembly operable to draw air through the port and push air through the air distribution layer,
wherein the port further comprises a connector secured within a passageway formed in the housing, the connector including a flange that is resiliently flexible such that the flange is deflectable to be positioned through the passageway and secure to the housing with an interference fit, and
wherein the connector includes a second flange that is also resiliently flexible such that the second flange is deflectable to be positioned through the passageway and secure to the housing with an interference fit.

17. The support surface of claim 16, wherein the support surface further comprises a conduit extending between the connector and the blower assembly, the conduit positioned on the connector such that air that flows through the tortuous path is conducted through the conduit and into the blower assembly.

18. The support surface of claim 16, wherein the housing includes a cylindrical body, the cylindrical body defining the passageway and a front surface, the passageway extending between the front surface and a back wall of the housing, the flange of the connector engaging the front surface to secure the connector to the housing.

19. The support surface of claim 16, wherein the flange of the cap engages a back wall of the housing to secure the cap to the housing.

20. The support surface of claim 16, wherein the housing includes a flange configured to engage a material about the periphery of the housing to be hermetically sealed to the material.

21. The support surface of claim 16, the tortuous path includes a first stage that extends between an exterior of the lower cover and an inner wall of the housing.

22. The support surface of claim 21, wherein the tortuous path includes a second stage that extends between the inner wall of the housing and the interior of the cap, the second stage directing flow in a direction opposite the direction of flow in the first stage.

\* \* \* \* \*